United States Patent [19]

Kriegler et al.

[11] Patent Number: 5,131,229
[45] Date of Patent: Jul. 21, 1992

[54] INTERNAL-COMBUSTION ENGINE WITH EXHAUST GAS TURBOCHARGER

[75] Inventors: Wolfgang Kriegler, St. Paul im Lavanttal; Hans Aufinger; Franz Schweinzer, both of Graz, all of Austria

[73] Assignee: AVL Gesellschaft für Verbrennungskraftmaschinen und Messtechnik M.B.H. Prof.Dr.Dr.h.c. Hans List, Graz, Austria

[21] Appl. No.: 563,205

[22] Filed: Aug. 3, 1990

[30] Foreign Application Priority Data

Aug. 3, 1989 [AT] Austria ................... 1875/89

[51] Int. Cl.$^5$ .............................................. F02B 33/44
[52] U.S. Cl. .................... 60/605.2; 123/25 B; 123/25 D
[58] Field of Search ............... 60/605.2; 123/25 B, 123/25 D

[56] References Cited

U.S. PATENT DOCUMENTS 3,970,052 7/1976 Andoh ................... 123/570
4,702,218 10/1987 Yoshioka et al. ........... 60/605.2

FOREIGN PATENT DOCUMENTS 109755A 8/1980 Japan ................... 60/605.2

Primary Examiner—Richard A. Bertsch
Assistant Examiner—Charles G. Freay
Attorney, Agent, or Firm—Watson, Cole, Grindle & Watson

[57] ABSTRACT

In order to utilize recycling of exhaust gases at high engine loads in an internal-combustion engine with an exhaust gas turbocharger, optionally with a charge cooler, as well as an exhaust gas recycling valve which is arranged within a connecting pipe through which a partial exhaust gas stream flows, the connecting pipe, in the direction of the flow, branching from the exhaust pipe upstream of the exhaust gas turbine and connecting into the charge pipe downstream of the exhaust gas turbine, an apparatus is employed which injects water into the partial exhaust gas stream flowing the connecting pipe at operating temperature and at high load operation of the internal-combustion engine.

4 Claims, 1 Drawing Sheet

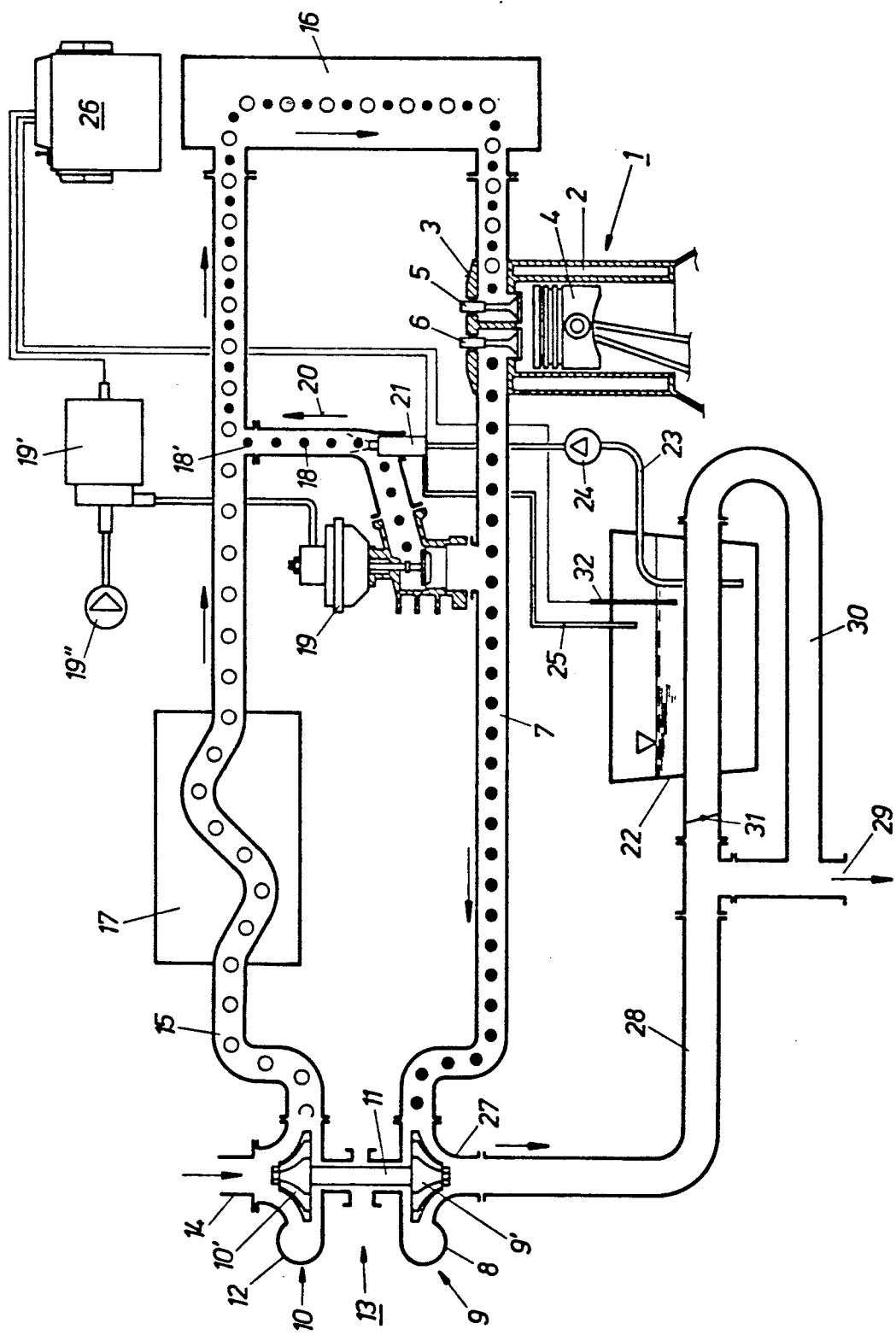

INTERNAL-COMBUSTION ENGINE WITH EXHAUST GAS TURBOCHARGER

BACKGROUND OF THE INVENTION

The invention refers to an internal-combustion engine with an exhaust gas turbocharger, optionally with a charge cooler, as well as a an exhaust gas recycling valve which is arranged within a connecting pipe, whereby the connecting pipe branches, in the direction of the flow, from the exhaust pipe before the exhaust gas turbine and enters into the charge pipe after the exhaust gas turbine.

In order to fulfill the expected strict legal regulations concerning emissions of nitrogen oxides, the developers and producers of diesel engines in commercial vehicles will be forced in the further to drastically reduce the emissions of nitrogen oxides produced by such engines.

In the test methods legally prescribed for diesel engines for commercial vehicles (Europe 13 stage test; USA Heavy Duty Transient Cycle) approx. 70 to 80% of the nitrogen oxides are produced at high engine loads. Up to the present day it was deemed impossible to apply recycling of exhaust gases at high engine loads, even though successfully used at low engine loads, to reduce emissions of nitrogen oxides, because, on the one hand, a strong increase of particle and soot emissions were to be expected, and, on the other hand, durability would be deceased by increased wear and tear. The increase in wear and tear occurs due to the fact that when uncleaned diesel exhaust gases are used, solid particles are dragged into the motor oil via the oil film on the cylinder walls. Furthermore, it was expected that by the recycling of exhaust gases, the charge temperature in the heavy-duty points would strongly be increased, which would promote the production of nitrogen oxides in the combustion, thus strongly impeding the decrease of nitrogen oxides by the recycling of exhaust gases.

A majority of present engines in commercial vehicles comprise, as stated above, a charge cooler for lowering production of nitrogen oxides, and reducing fuel consumption. A recycling of exhaust gases at high engine loads wold only make sense if the recycled exhaust gas would be added to the intake air stream before the charge cooler. This procedure is not feasible due to the fact that for achieving sufficient cooling unacceptable constructional efforts and excessive amounts of energy would be needed. Furthermore, particles contained in the recycled exhaust gases from conventional combustion engines would lead to soiling because of depositing and, consequently, ineffectiveness and blocking of the charge cooler.

Therefore the only remaining option would consist of cleaning the recycled gas or adding it to the intake air stream uncleaned—thus accepting the soiling—and heating the charge after the charge cooler.

It is also known, for the purpose of cooling the cylinder heat and the piston of high-performance engines, in particular racing engines, to inject water into the combustion chamber. It was noticed, as a side effect, that a reduction in the emissions of nitrogen oxides occurred.

SUMMARY OF THE INVENTION

It is the object of the invention to avoid the disadvantages mentioned above with internal-combustion engines and to keep the increase in the charge temperature as small as possible when applying exhaust gas recycling at high engine loads for the purpose of reducing emissions of nitrogen oxides.

The invention consists of an apparatus which injects water into the partial stream of exhaust gases moving through the connecting pipe at operating temperature an at high engine loads of the internal combustion engine. Thus the injected amount of water evaporates and cools the partial stream of exhaust gases due to the absorbed evaporation heat. The injected amount of water is transported to the cylinder by the exhaust gas, or the mixture of air and exhaust gases respectively, whereby the known effect caused by the injection of water is exploited in that the amount of nitrogen oxides is decreased.

Recently made developments in the field of combustion in diesel engines in commercial vehicles have shown that the particle amounts in these engines at high engine loads, can be kept so low that a 10 or 20% exhaust gas recycling rate without prior cleaning and addition after the charge cooler seems to be possible. The low amounts of particles in the recycled exhaust gases also diminish the problem of increased water and tear of the engine due to the spoiling of the lubricating oil by the recycling of the exhaust gases.

A further arrangement of the invention provides that the apparatus for injecting water comprises a water tank as well as a fore-pump connected thereto, the pump being connected with an electronically-controlled injection valve, whereby the amounts of water to be injected are stored in the engine performance characteristics in the engine electronics.

It is particularly preferable, if, in accordance with a further feature of the invention, the water injection valve in the connecting pipe are arranged, in the direction of the flow of the partial exhaust gas steam, downstream of the exhaust gas recycling valve.

For the purpose of achieving a good mixture an evaporation of the water injected into the partial stream of exhaust gases, the water injection valve may be encompassed, in accordance with the invention, by the partial exhaust gas stream.

Within the scope of the invention it may be provided, for the purpose of protecting the water injection valve, to cool the valve by an amount of rinsing water recycling into the water tank.

For operation in water a further feature of the invention may provide a heating device for the water tank, whereby, for example, a temperature sensor may be included in the water tank which, in the case of formation of ice, opens a butterfly valve via the engine electronics, thus guiding exhaust gases through the water tank for the purpose of heating the water.

Finally the invention provides that a temperature sensor is arranged in the water tank which controls, via the engine electronics, an electrically driven heating device for the water tank.

The invention will be further understood by reference to the accompanying FIGURE, which schematically shows a preferred embodiment.

DETAILED DESCRIPTION OF THE PREFERRED EMBODIMENT

The internal-combustion engine, generally referred to as 1, comprises a cylinder 2, a cylinder head 3, a piston 4 moving up and down, as well as an inlet valve 5 and a exhaust valve 6. Exhaust pipe 7 downstream of exhaust valve 6 is connected within the flow with spiral casing 8 of an exhaust gas turbine 9. Blower wheel 9' of exhaust gas turbine 9 is rotationally rigidly connected with blower wheel 10' of air compressor 10 via shaft 11. The spiral casing of air compressor 10 is generally designated as 12, the turbo charger formed by exhaust gas turbine 9 and air compressor 10 as 13. Via nozzle 14 fresh air flows in an axial direction into the spiral casing 12 of air compressor 10; between exhaust pipe 7 and charge pipe 15 a connecting pipe 18 is provided via which—whilst being controlled by an electroneumatically-driven exhaust gas recycling valve 19, not described here in detail—a partial flow of exhaust gases can flow from exhaust pipe 7 to charge pipe 15 in the direction of arrow 20. The electropneumatic booster is designated as 19' and the vacuum pump as 19''. Water injection valve 21 is arranged, in the direction of the flow of the partial exhaust gas stream, in connecting pipe 18 downstream of exhaust gas recycling valve 19, so that, in order to achieve a more thorough mixing of the injected water with the partial exhaust gas stream, the water injection valve is encompassed by the partial exhaust gas stream. From muzzle section 18' of connecting pipe 18, which is attached to charge pipe 15, a mixture of air, exhaust gases and water vapour flows through charge pipe 15, or suction pipe 16, respectively, at operating temperature and at high loads of the internal-combustion engine, as is described in the drawing by symbols.

The electronically controlled water injection valve 21 is supplied with water from tank 22 via pipe 23 by means of water pump 24 (fore-pump)., For the purpose of cooling water injection valve 21, water pump 24 supplies an excessive amount of rinsing water which flows back to the water tank via pipe 25. An electronic control unit 26 ensures that the predetermined amounts of water attributed to the engine performance characteristics are only injected at operating temperature and at high loads, of the internal-combustion engine.

The main flow of exhaust gases leaves the spiral casing 8 of exhaust gas turbine 9 through pipe muzzle 27 and reaches exhaust 29 via exhaust pipe 28. At temperatures prevailing during the winter (below 0° C.) a part of the main flow of exhaust gases can be directed through water tank 22 via exhaust gas by-pass pipe 30 by means of opening butterfly valve 31, whereby said pipe extends through said water tank. This process may be automated. Icing up of the water tank may be allowed, as the injection of water is, after cold starting, not yet needed. Temperature sensor 32 located in water tank 22 reports any occurring icing to control electronics 26, whereupon, by opening butterfly valve 31, exhaust gases are directed through water tank 22 for the purpose of heating. As soon as the content of the water tank is liquefied, butterfly valve 31 is closed again.

As an alternative to the above-mentioned heating of the water tank, an electric-heater or one driven by liquid or gaseous fuels may be provided. In such a case the water tank requires the best possible insulation.

The problem of corrosion in the suction area and cylinder which is connected with the injection of water is resolved by the fact that in between high load operation and switching-off of the engine there is a phase of partial-load operation without injection of water which allows the drying of any wetted components. Nevertheless, the use of low-sulphur fuels is hereby recommended in order to prevent corrosion in the exhaust and exhaust gas recycling system. The arrangement in accordance with the invention may be combined with any known exhaust gas treatment system such as particle filter, catalyst, etc.

We claim:

1. In an internal combustion engine with an exhaust gas turbocharger comprising an air compressor and an exhaust gas turbine, and with an exhaust gas recycling valve which is arranged within a connecting pipe for partial exhaust gas flow, branching, in the direction of the flow, from an exhaust pipe upstream of said exhaust gas turbine and engine into a charge pipe downstream of said air compressor, the improvement wherein said engine includes an apparatus which injects water into the partial exhaust gas stream flowing through said connecting pipe, wherein said apparatus for injecting water comprises a water tank and a fore-pump connected thereto, said fore-pump being connected to an electronically driven water injection valve, whereby the amounts of water to be injected are stored in engine characteristics of the engine electronics and wherein the water injection valve is cooled by an amount of rinsing water recycling into said water tank.

2. An internal combustion engine according to claim 1, including a heating means for heating the water in said water tank in wintertime.

3. An internal combustion engine according to claim 2, wherein said heating means comprises a exhaust gas by-pass pipe leading from a discharge pipe extending away from said exhaust gas turbine, and including a temperature sensor in said water tank connected to said electronic control unit and a butterfly valve in said by-pass line controlled by said electronic control unit.

4. An internal combustion engine according to claim 2, wherein said heating means comprises an electrical heater controlled by said water tank connected to said electronic control unit.

* * * * *